United States Patent

McLeish et al.

(10) Patent No.: US 10,091,064 B2
(45) Date of Patent: Oct. 2, 2018

(54) SYSTEMS AND METHODS FOR STATELESS MANAGEMENT OF OBJECT PROPERTIES

(71) Applicants: David McLeish, Ely (GB); Javeed Nizami, Plano, TX (US)

(72) Inventors: David McLeish, Ely (GB); Javeed Nizami, Plano, TX (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 572 days.

(21) Appl. No.: 13/916,093

(22) Filed: Jun. 12, 2013

(65) Prior Publication Data

US 2014/0372581 A1 Dec. 18, 2014

(51) Int. Cl.
*G06F 15/173* (2006.01)
*H04L 12/24* (2006.01)

(52) U.S. Cl.
CPC ...... *H04L 41/0893* (2013.01); *H04L 41/0233* (2013.01)

(58) Field of Classification Search
CPC ......... G06F 17/30607; G06F 17/30519; G06F 17/30082; G06F 21/604; G06F 17/30575; H04L 41/0293; H04L 41/08; H04L 41/0893; H04L 41/0233; G06Q 30/0621; G06Q 30/0643
USPC ................................................. 709/223, 220
See application file for complete search history.

(56) References Cited

U.S. PATENT DOCUMENTS

| | | | | |
|---|---|---|---|---|
| 5,974,254 A | * | 10/1999 | Hsu ........................... | G06F 8/71 714/37 |
| 6,633,560 B1 | * | 10/2003 | Albert ..................... | H04L 29/06 370/351 |
| 7,353,510 B2 | * | 4/2008 | Noirot-Nerin ...... | G06F 9/44505 717/169 |
| 7,606,895 B1 | * | 10/2009 | Dini ........................ | H04L 12/14 709/223 |
| 8,429,140 B1 | * | 4/2013 | Lolayekar ......... | G06F 17/30607 707/694 |
| 2004/0230578 A1 | * | 11/2004 | Graves .............. | G06F 17/30595 |
| 2005/0005011 A1 | * | 1/2005 | DeLuca ................ | H04L 41/046 709/224 |
| 2006/0161563 A1 | * | 7/2006 | Besbris ................... | G06F 9/445 |
| 2011/0161874 A1 | * | 6/2011 | Doughty ................... | G06F 8/33 715/810 |
| 2012/0136829 A1 | * | 5/2012 | Darcy ............... | G06F 17/30575 707/626 |
| 2014/0279092 A1 | * | 9/2014 | Hurst ................ | G06Q 30/0641 705/15 |

* cited by examiner

*Primary Examiner* — Daniel C. Murray
*Assistant Examiner* — Kristoffer L S Sayoc

(57) ABSTRACT

Methods for stateless management of object properties and corresponding systems and computer-readable mediums. A method includes executing a presenter module that manages interactions with a user via a view module, and identifying a required object property for the presenter module. The method includes registering the required object property, by the presenter module, in a policy manager module as a property policy. The method includes building a request for a service based on the property policy, sending the request to the service, and receiving a response to the request from the service.

17 Claims, 5 Drawing Sheets

SYSTEMS AND METHODS FOR STATELESS MANAGEMENT OF OBJECT PROPERTIES

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems) and to other data processing systems, including but not limited to any system that requests data using services.

BACKGROUND OF THE DISCLOSURE

PDM systems manage PLM and other data. Improved systems are desirable.

SUMMARY OF THE DISCLOSURE

Various disclosed embodiments include methods for stateless management of object properties and corresponding systems and computer-readable mediums. A method includes executing a presenter module that manages interactions with a user via a view module, and identifying a required object property for the presenter module. The method includes registering the required object property, by the presenter module, in a policy manager module as a property policy. The method includes building a request for a service based on the property policy, sending the request to the service, and receiving a response to the request from the service.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
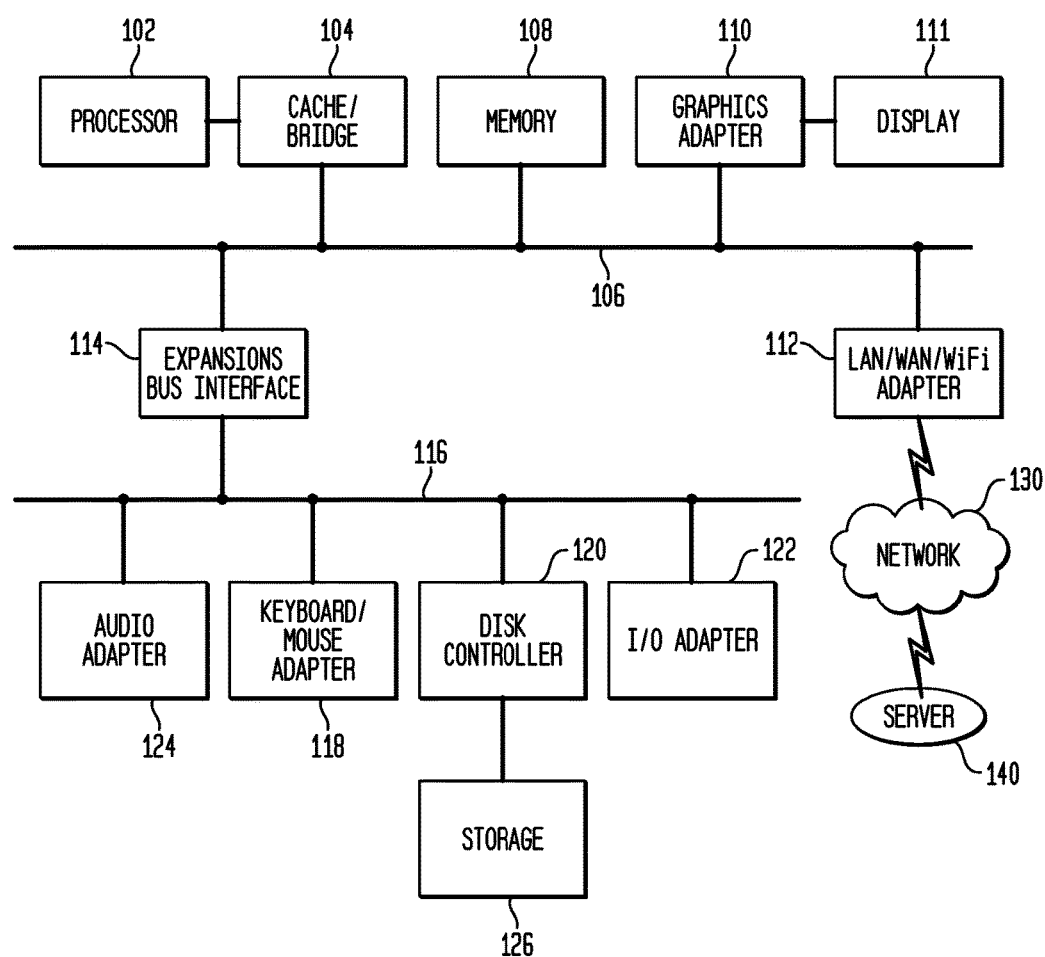
FIG. 1 depicts a block diagram of a data processing system in which an embodiment can be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Most companies deploy multi-tier enterprise software across wide-area network (WAN) boundaries; often encompassing several physical machines across the globe. The Enterprise tier, including business logic servers, and Resource tier, including databases and volumes, are often deployed in corporate server farms which are on different continents from the users (and their application clients). This trend is driven by site consolidation, cloud computing, increasingly global companies and demands for centralized information technology and centralized control of intellectual property.

In such a multi-tiered global deployment, feature-rich browser-based clients operate over high latency WAN (cross-continental up to 300 ms) to communicate with a REST endpoint, which can also have limited bandwidth. REST represents Representational State Transfer, and is an architectural technique in which every resource "endpoint" is addressed by using a unique address or uniform resource identifier (URI). Other REST-based systems experience similar issues.

A client can communicate over that WAN using a service-oriented approach whereby coarse-grained service requests are made by the client to the REST endpoint. In designing these services to handle a user-interaction as a single coarse-grained explicit service call, the WAN latency does not impact the user experience and perceived responsiveness of the client.

In such a deployment, business objects, whether persistent database objects, or computed at runtime, can each have hundreds of discrete properties. These properties encompass dynamic and computed runtime properties that have computational, marshaling, and population costs when provided as objects in a service response for the client to consume, as part of the service data model. Objects with high volumes of properties also require increased bandwidth demands, de-marshaling performance cost, and memory requirements at the client. For a browser-based client operating in a resource constrained environment like a phone or tablet device with limited WAN bandwidth at high latency, consuming objects, each with hundreds or more of such properties, can impact the performance and responsiveness of the client for the user. In most cases, the client does not require all of those hundreds of possible properties for a given object.

The object property requirements of the client are in fact dynamic in the following dimensions: first, depending on the content of the client user interface at a given point in time; second, depending on the user context (user, group, role, project); and third, by the degree of customization of the data model and customization of the user interface (such as which columns of a table view are being displayed).

A way of minimizing the properties provided for given object types in a service response is to use an object property policy. This is a mechanism by which for a given object type it is possible to specify the properties that are required. Two approaches to administering this are deploying a set of policy files at the Enterprise tier, or alternatively employing a client application service that specifies a given policy on a dedicated service call.

These two approaches have shortfalls. In the former case, this is not adaptive to the changing needs of the client depending on its application content. It is a pre-meditated aggregated policy which in order to accommodate all of the possible needs of the client tends to result in a bloated definition. As a result, the properties set tends to be a very large set resulting in the performance and resource challenges stated above.

The second approach, wherein the application layer code in the client makes a separate dedicated service call to specify a given pre-defined policy, has a number of disadvantages. It is stateful, since the server has to store and apply the same policy for each subsequent call regardless of which server instance is serving the call. It is not explicit, the behavior and contents of the response of subsequent service calls is beyond the scope of that given call and its request document. Further problems arise when different applications in the client are independently requiring different policies and so directly impacting the needs of one-another when they set the active policy for a given server instance.

Disclosed embodiments include a client-driven explicit and adaptive object property policy that allows for statelessly optimizing the property handling for resource-constrained client environments in global WAN deployments.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified; in other cases, other operating systems can be used such as custom or open-source operating systems. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. The client systems and various other systems described below can all be implemented, for example, as a data processing system 100.

Disclosed embodiments implement a property policy for stateless property handling driven by the client system. The property needs of the client are dynamic. At any given time it is the aggregation of the needs of each of its constituent application presenters. Property requirements are client driven. Each application presenter registers, unregisters, and updates its individual object property policy needs tied to its lifecycle events. While the specific examples described herein use a model-view-presenter architecture, the policy management techniques described herein are not limited to this architecture. Accordingly, "presenter" and "presenter module," unless specified otherwise, are intended to refer to any client-based process or module that performs as indicated with regard to policy registrations and use, and "view" and "view module," unless specified otherwise, are intended to refer to any client-based process or module that performs as indicated with regard to managing a user interface; in some cases, the presenter module and the view module can be the same software module or application.

An Object Property Policy Manager as disclosed herein provides aggregation so that the effective property needs are dynamic and continually managed. As a result, the property needs of the client are explicitly specified and injected into the service request to apply the property expectations for that specific service response. This can, therefore, be applied and managed statelessly without the conflicts and inefficiencies from previous approaches. At the Enterprise Tier, the service framework dynamically applies and unwinds the dynamic policy explicitly provided for the scope of that service.

This approach ensures predictable and optimal property handling in the performance of resource constrained client environments in global WAN deployments.

This approach is useful for any client application where there is the potential for conflicting and disparate attributes that are lazy loaded based on the dynamic needs of the client and where those properties are retrieved across a high latency global WAN deployment.

An object property policy as disclosed herein dictates the required properties for given object types. It determines the properties that are returned in a service response for given objects by the server for a given service call. This policy can be constructed dynamically by a client system given the property requirements of its application consumers. For example, in a model-view-presenter (MVP) system architecture, the policy is tailored to the client's needs as registered by its presenters.

The policy is included in the service request document or headers when a call is made to the server. In this way the object property policy needs are explicitly stated on the request and there are no implied stateful assumptions about the active property policy at a server, or indeed which server is handling the request. This explicit and stateless means of specifying the client's property requirements ensures the service-oriented architecture (SOA) request is standalone and is resilient to server reassignment. In addition, it ensures the bandwidth, computation, population, and marshaling performance costs are optimal for the needs of the client in a resource constrained global WAN deployment.

At the client system, a policy manager module (or simply "policy manager"), ObjectPropertyPolicyManager in some examples, is designed to centrally manage the client's property requirements. The client's policy manager module manages the client's property requirements as registered with it by the application being executed by the client; such applications are generally referred to as views and presenters herein. The policy manager module combines the needs of the client's views/presenters, for example, the needs of a tree view with certain columns, etc. To prevent ripple to client application callers, the policy manager module is in the client framework layer. It can be queried by an operation manager module or the presenter module when a service request is to be sent to insert/inject the property policy in the request.

On making a service call, the effective aggregated needs of the application, as provided by the policy manager, are used in constructing the service request by the client system.

According to disclosed embodiments, the property needs are registered by the application for insertion in the service calls. The application's presenters register, update, and unregister their object property policy requirements with the policy manager as needed. In this way, the policy manager can manage the needs of the application and maintain the effective policy. The effective policy is used when constructing the SOA request in order to explicitly specify the client's object property policy needs for a service operation.

As the needs of the client change, such as when a new column is added to a table for a given presenter, or when a new presenter is created, the effective policy is managed by the policy manager.

Figure 2:
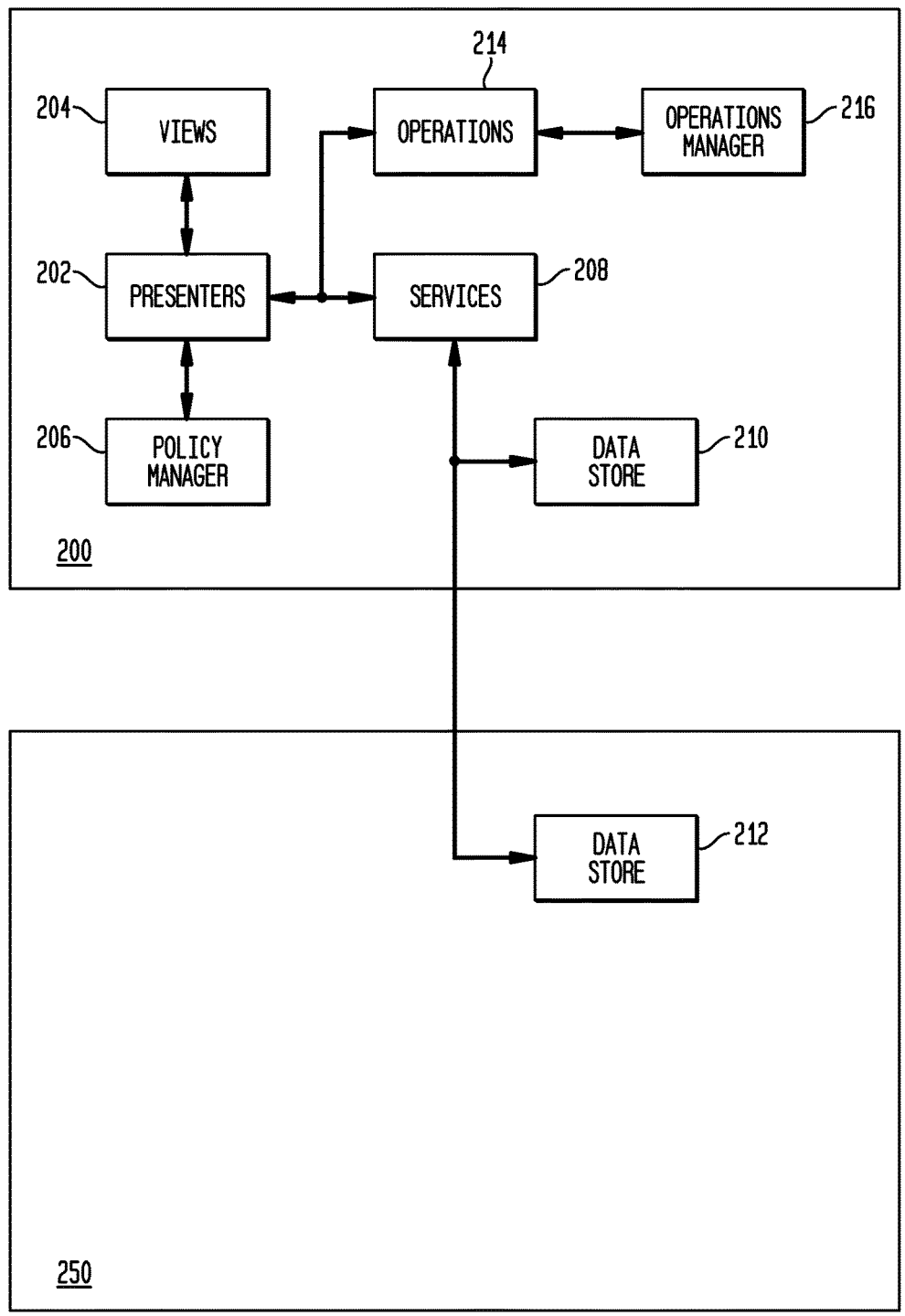
FIG. 2 illustrates an example of modules that may be used in a client system and a server system, in accordance with disclosed embodiments.

FIG. 2 illustrates an example of modules that may be used in a client system 200 and server system 250, in accordance with disclosed embodiments, either or both of which can be implemented, for example, as a data processing system 100. Of course, other software applications and module can and typically will be implemented on each system.

Client system 200 includes one or more presenter modules 202 ("presenters") that manage the user interface views 204 ("views") by receiving events from and making appropriate updates to the views 204. Presenters 202 update policies with policy manager module 206 ("policy manager"), including registering, unregistering, adding, deleting, and performing other functions with regard to the policies. Presenters 202 communicate with one or more services 208, which manage calls to data sources, including, in various embodiments, local data stores 210 or remote data stores 212 located on one or more server systems 250. Presenters 202 can invoke one or more operations 214, which can request and schedule execution from operations manager module 216 ("operations manager"). A client application can use each of these modules to perform processes as described herein. Of course, these labels are not required in any implementation; any software application, module, or other process that performs as described is intended to be included in these descriptions.

According to disclosed embodiments, when a presenter 202 requires a service 208 to access or retrieve data from a data store 210 or 212, for example, it requests only the data defined by the policies stored in policy manager 206. In this way, unnecessary data is not requested or transmitted, making processing more efficient in terms of both responsiveness and bandwidth. The request itself, transmitted from presenter 202 to service 208, explicitly specifies the objects and properties required according to the policy. Of course, in various embodiments, there is potential business logic and computational complexity that is used for populating and computing the properties, at the server, that handles the request in question beyond it simply being a data store access.

Figure 3:
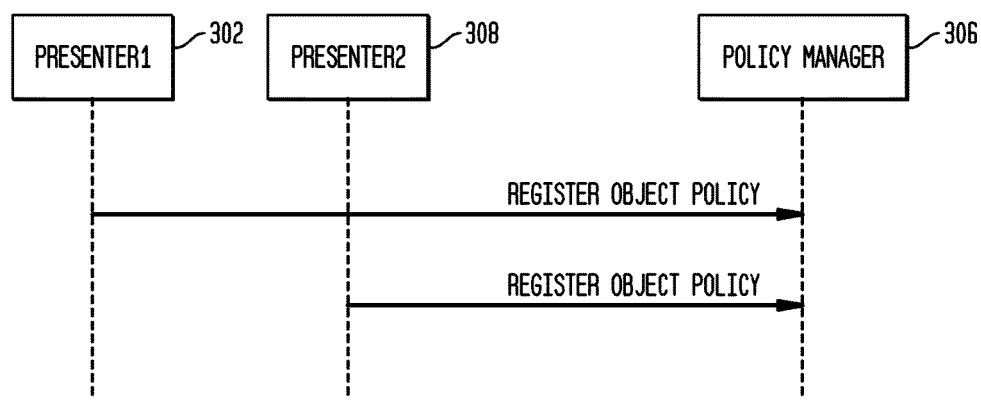
FIGS. 3-8 illustrate processes in accordance with disclosed embodiments.

In order to demonstrate such an operation, FIG. 3 illustrates a registration process from the client application's perspective, in accordance with disclosed embodiments.

Presenter1 302 constructs its own object property policy definition based upon its own property needs. This can be done, for example, by Presenter1 302 dynamically determining its needs based upon what is being displayed in the view, by Presenter1 302 reading a static policy from file, or by other means that will be apparent to those of skill in the art.

Presenter1 302 registers its policy/property needs with the Policy Manager 306 at the point that Presenter is revealed/active in the client. Those policies can be used when accessing services. In this example, Presenter1 302 registers its set of required properties for given theoretical object types checked_out, object_name properties on object type A with the policy manager 306. As a specific nonlimiting example, Presenter1 302 can register the object property policy with the ObjectPropertyPolicyManager using "registerObjectPolicy". This is done independently by each Presenter given its needs and its lifecycle events.

Presenter2 308 can also construct its own object property policy definition based upon its own property needs, and register its set of desired properties object_name and owning_user on object type A with policy manager 306. The effective object policy in policy manager 306 now has checked_out, object_name, and owning_user properties on object type A. Object_name property has a registered count of 2 since interest in it is registered by both Presenter1 and Presenter2. The capturing of the registration counts allows the policy manager to properly deregister the policies. For example, if that information was not captured it could mean that properties required by Presenter1 will get removed when Presenter2 deregisters. Disclosed embodiments can avoid this problem by tracking how many times a property is registered, and by which presenters, as described below with respect to FIG. 6.

The object property policy of Presenter1 302 and Presenter2 308 are independent. Each presenter can independently register interest in whichever objects and whichever properties it wishes. In addition, how a Presenter is designed to compute its own policy definition before registering it can have entirely independent mechanisms or approaches. Regardless of how each presenter determines what objects and its properties are required, they register them with the policy manager 306.

Figure 4:
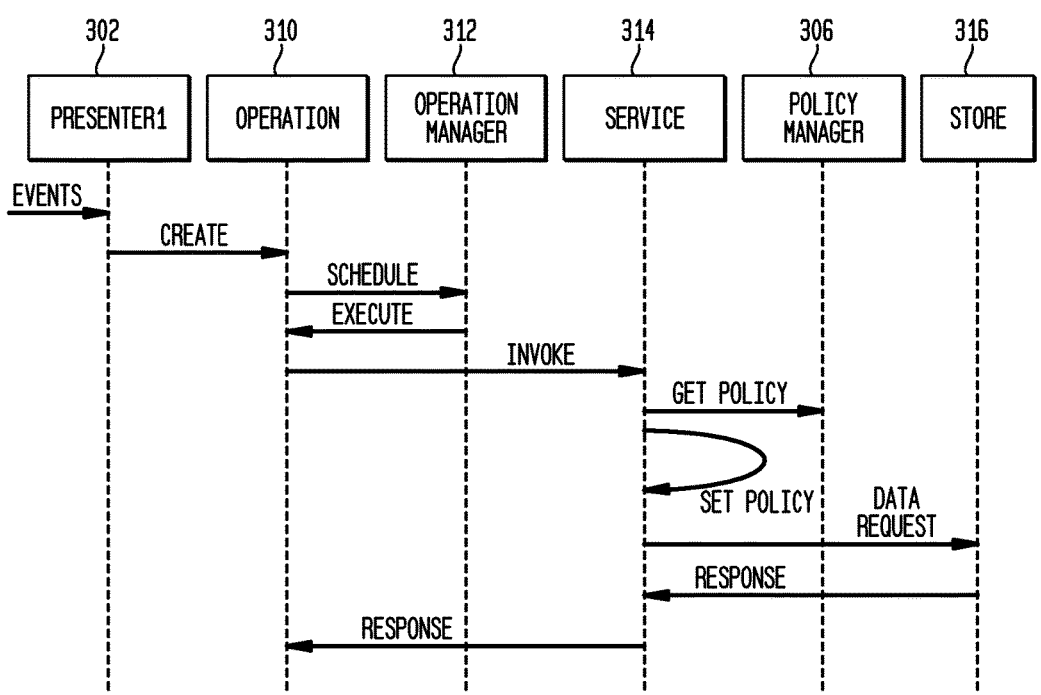

FIG. 4 illustrates a service call in accordance with disclosed embodiments. Presenter1 302 receives an event from a view, such as a user input, and, in response, creates an operation 310 and initiates a service call. Initiating the service call can result in the operation 310 sending a scheduling request to operation manager 312 and receiving in response an execution order. The operation calls the service 314, on the client system, which queries the effective object property policy from the policy manager 306. The service 314 explicitly sets the policy, from policy manager 306, in the service request envelope. The service 314 can make the data request to store 316 according to the policy, and receive the requested data; the requested data can be limited to the objects or properties defined by the policy, omitting other objects and properties. The service response includes checked_out, object_name, and owning_user properties on objects of type A returned to the client in this example.

Figure 5:
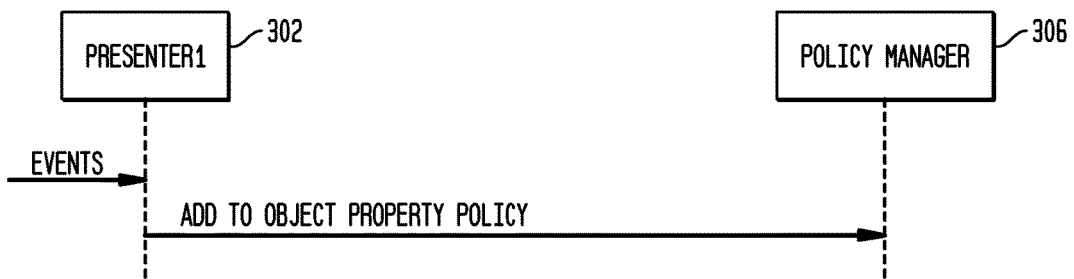

FIG. 5 illustrates adding a property to the property manager in accordance with disclosed embodiments. In this example, in response to receiving one or more events from a view, Presenter1 302 adds a creation_date property to the object property policy it registered with policy manager 306. The effective object policy in policy manager 306 now has checked_out, object_name, owning_user, and creation_date properties on object type A.

Figure 6:
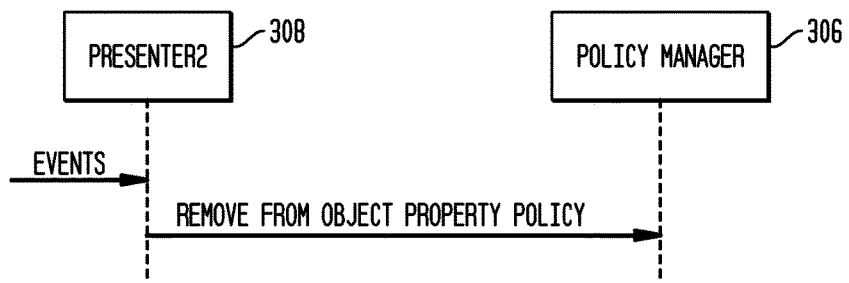

FIG. 6 illustrates removing a property from the property manager in accordance with disclosed embodiments. In this example, in response to receiving one or more events from a view, Presenter2 308 removes owning_user property from the object property policy it registered with policy manager 306. At this point, the effective object policy in policy manager 306 now has checked_out, object_name, and creation_date properties for object type A. Note that Presenter2 exclusively "owned" the owning_user property on object type A, so its removal does not affect Presenter1 302.

Figure 7:

FIG. 7 illustrates unregistering properties when a presenter closes, in accordance with disclosed embodiments. When Presenter1 302 is closed, for example in response to receiving an event such as an "unbind" from a view, it unregisters its object property policy. The effective object policy in policy manager 306 now includes object_name and creation_date properties on objects of type A; object_name is still there because it was also registered by Presenter2 308.

As the needs of the client change, such as when a new column is added to a table for a given presenter, or when a new presenter is created, the effective policy is maintained and managed by the policy manager 306. The policy manager 306 acts as a dynamic aggregator of the changing needs of the client. This ensures the property handling is optimized for the needs of the client and can be explicitly and statelessly employed.

Figure 8:
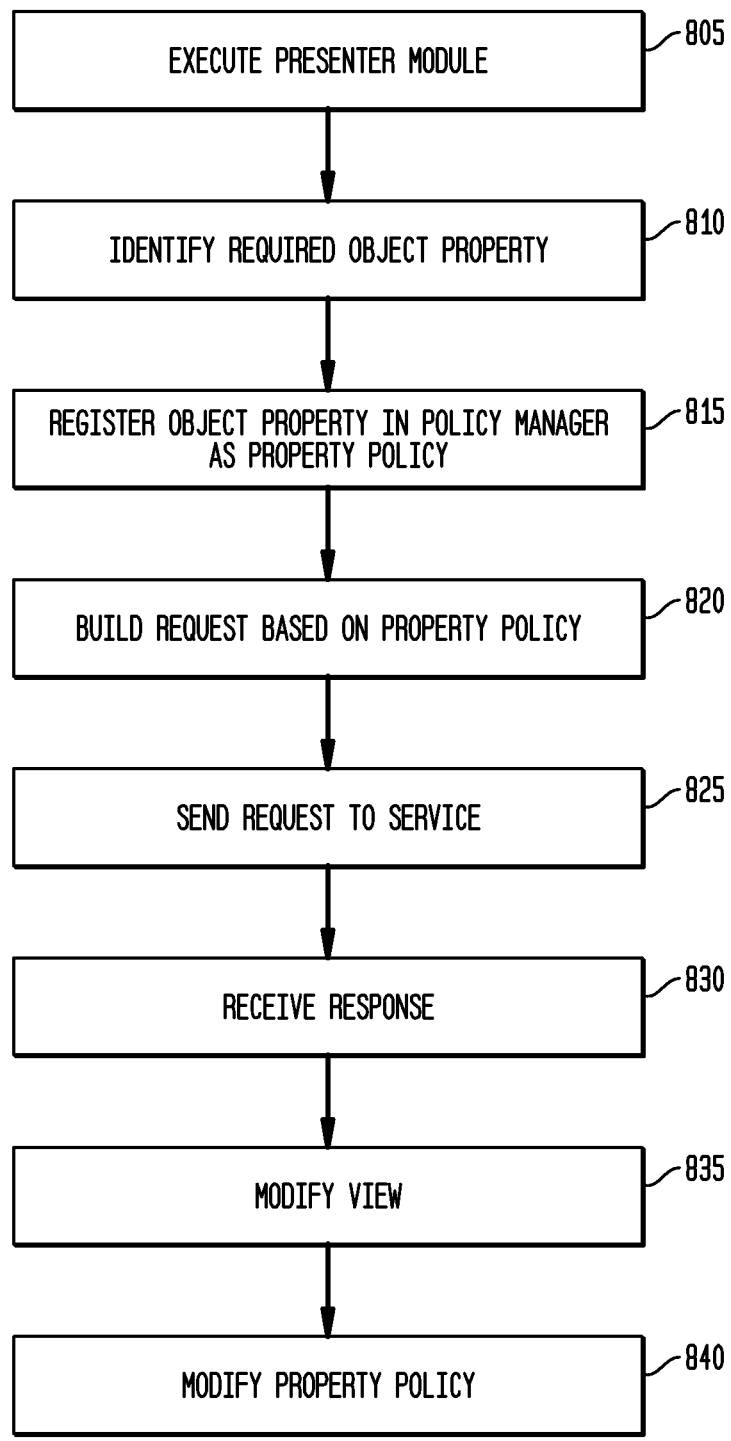

FIG. 8 depicts a flowchart of a process in accordance with disclosed embodiments that may be performed, for example, by a client PLM or PDM system ("the system").

The system executes a presenter module that manages interactions with a user via a view module (805).

The system identifies a required object property for and by the presenter module (810). As described above, this is typically implemented by the presented module determining its own current object property policy needs. In most cases, there will be multiple object property requirements.

The system registers the required object property, by the presenter module, in a policy manager module as a property policy (815). As described above, there may be multiple object property requirements, so the presenter module registers its object property requirements as a property policy with the policy manager.

The system builds a request for a service based on the property policy (820). This can include querying the policy manager, by the presenter or by an operation manager, to determine the required object property policy. The request can explicitly include the required object property policy. Where there are multiple presenters with registered policies, the request can be based on the aggregation of multiple (or all) registered policies from multiple (or all) presenters, not just the one presenter.

The system sends the request to the service (825). The service can be executed by the system or the request can be transmitted to a service on another data processing system for execution.

The system receives a response to the request from the service (830). The response corresponds to the property policy, as expressed in the request, and includes the required object property or properties. In various embodiments, the response excludes properties that do not correspond to the property policy. Where there are multiple presenters with registered policies, the response can correspond to the aggregated registered needs of multiple (or all) active presenters' policies, not just one presenter.

The system can modify a user view in the view module, by the presenter, according to the response (835).

The system can modify the property policy (840). This can include adding an object property to the property policy for a given presenter, removing an object property from the property policy for a given presenter, deregistering an object property from the property policy for a given presenter, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for stateless management of object properties, the method performed by a data processing system and comprising:
   executing a first presenter module software that manages interactions with a user via a view module software;
   identifying at least two required object properties of the same first object type for the first presenter module software, wherein the required object properties include a first required object property for a first object type;
   registering the required object properties, by the first presenter module software, in a policy manager module software as a first property policy;
   executing a second presenter module software that manages interactions with the user via the view module software;
   identifying at least two required object properties for the same first object type for the second presenter module software including a second required object property that is different than the first required object property, wherein the required object properties for both the first and second presenter modules software further include at least one same third object property for the same first object type;
   registering the required object properties, by the second presenter module software, in the policy manager module software as a second property policy;
   building a request for a service based on both the first property policy and the second property policy;
   sending the request to the service; and
   receiving a response to the request from the service that includes data corresponding to the first object property, the second object property, and the third object property for the first object type.

2. The method of claim 1, wherein the request explicitly includes the required property policy.

3. The method of claim 1, wherein the response corresponds to the property policy and includes the at least two required object properties.

4. The method of claim 1, wherein the system modifies a user view in the view module software, by the presenter module software, according to the response.

5. The method of claim 1, wherein the system modifies the property policy, by the presenter module software, by adding an object property to the property policy or removing an object property from the property policy.

6. The method of claim 1, wherein the system modifies the property policy, by the presenter module software, by deregistering an object property from the property policy.

7. A data processing system comprising:
   a processor; and
   an accessible memory, the data processing system particularly configured to execute a first presenter module software that manages interactions with a user via a view module software;
   identify at least two required object properties of the same first object type for the presenter module software, wherein the required object properties include a first required object property for a first object type;
   register the required object properties, by the first presenter module software, in a policy manager module software as a first property policy;
   execute a second presenter module software that manages interactions with the user via the view module software;
   identify at least two required object properties for the same first object type for the second presenter module software including a second required object property that is different than the first required object property, wherein the required object properties for both the first and second presenter modules software further include at least one same third object property for the same first object type;
   register the required object properties, by the second presenter module software, in the policy manager module software as a second property policy;
   build a request for a service based on both the first property policy and the second property policy;
   send the request to the service; and
   receive a response to the request from the service that includes data corresponding to the first object property, the second object property, and the third object property for the first object type.

8. The data processing system of claim 7, wherein the request explicitly includes the required property policy.

9. The data processing system of claim 7, wherein the response corresponds to the property policy and includes the at least two required object properties.

10. The data processing system of claim 7, wherein the system modifies a user view in the view module software, by the presenter module software, according to the response.

11. The data processing system of claim 7, wherein the system modifies the property policy, by the presenter module software, by adding an object property to the property policy or removing an object property from the property policy.

12. The data processing system of claim 7, wherein the system modifies the property policy, by the presenter module software, by deregistering an object property from the property policy.

13. A non-transitory computer-readable medium encoded with executable instructions that, when executed, cause one or more data processing systems to:
   execute a first presenter module software that manages interactions with a user via a view module software;
   identify at least two required object properties of the same first object type for the first presenter module software, wherein the required object properties include a first required object property for a first object type;
   register the required object properties, by the first presenter module software, in a policy manager module software as a first property policy;
   execute a second presenter module software that manages interactions with the user via the view module software;
   identify at least two required object properties for the same first object type for the second presenter module software including a second required object property that is different than the first required object property, wherein the required object properties for both the first and second presenter modules software further include at least one same third object property for the same first object type;
   register the required object properties, by the second presenter module software, in the policy manager module software as a second property policy;
   build a request for a service based on both the first property policy and the second property policy;
   send the request to the service; and
   receive a response to the request from the service that includes data corresponding to the first object property, the second object property, and the third object property for the first object type.

14. The computer-readable medium of claim 13, wherein the request explicitly includes the required property policy.

15. The computer-readable medium of claim 13, wherein the response corresponds to the property policy and includes the at least two required object properties.

16. The computer-readable medium of claim 13, wherein the system modifies a user view in the view module software, by the presenter module software, according to the response.

17. The computer-readable medium of claim 13, wherein the system modifies the property policy, by the presenter module software, by adding an object property to the property policy, removing an object property from the property policy, or deregistering an object property from the property policy.

* * * * *